INVENTORS
STANCEL C. ELLIS
JORGE J. HERSEL
LOUIS H. JOHNSON
RALPH H. NELSON
RODERICK A. YOST

BY Alexander Kozel
AGENT

INVENTORS
STANCEL C. ELLIS
JORGE J. HERSEL
LOUIS H. JOHNSON
RALPH H. NELSON
RODERICK A. YOST

BY Alexander Kozel
AGENT

United States Patent Office 3,454,342
Patented July 8, 1969

3,454,342
AUTOMATIC PNEUMATIC COLOR COMPARATOR APPARATUS AND PROCESS
Stancel C. Ellis, Jorge J. Hersel, and Louis H. Johnson, Pensacola, Ralph H. Nelson, Cantonment, and Roderick A. Yost, Pensacola, Fla., assignors to Monsanto Company, St. Louis, Mo., a corporation of Delaware
Filed June 21, 1965, Ser. No. 465,543
Int. Cl. B65g 5/00
U.S. Cl. 356—195                           10 Claims

ABSTRACT OF THE DISCLOSURE

An automatic color sample comparator and process utilizing indexing, aspirator and compression means cooperatively with a colorimeter to provide a continuous, uninterrupted process for comparing the chromaticity of color samples relative to a reference sample.

---

For purposes of illustration, the novel automatic color comparator and process is described in a textile application, however, other diverse applications are intended to be covered.

In textile practice it is customary, for purposes of quality control, to analyze dye properties of a plurality of yarn samples removed from bobbins packaged with yarn, processed from like materials and under like conditions. Conventionally, the yarn samples after being removed from separate bobbins, are dyed and then manually compared one by one with a color reference sample by known colorimetry practice and apparatus.

Conventional colorimeters require constant attention and a number of manual manipulative steps to operate. Each dyed yarn sample must be separately supplied to and removed from the colorimeter. Meter operation and notation of meter readings must be made. The conventional practice is time consuming and costly.

The primary object of this invention is to provide an automatic color comparator apparatus and process.

Another object is to provide an automatic dye depth analyzer self-operable to continuously, sequentially, and repeatedly feed and evaluate color information of an infinite number of dyed yarn samples.

In accordance with the invention, the novel automatic color comparator comprises, in brief, an independently operable machine having means to continually feed color samples to a colorimeter, to condition the color samples prior to analysis by the colorimeter, to print the results of differential color data sensed and to discharge the analyzed samples. The novel process comprises the continuous, sequential and repetitive steps of automatically feeding yarn samples, seriatim, to a color analysis zone, conditioning the samples, analyzing the samples, noting the analyzed information and discharging the samples.

A better understanding of the apparatus and process embodying the invention will be gained by reference to the following description and to the accompanying drawings. In the drawings, FIGURE 1 is an isometric view of the novel automatic color comparator;

In the several figures in the drawings the same reference numerals are used to identify like components.

Figure 1:
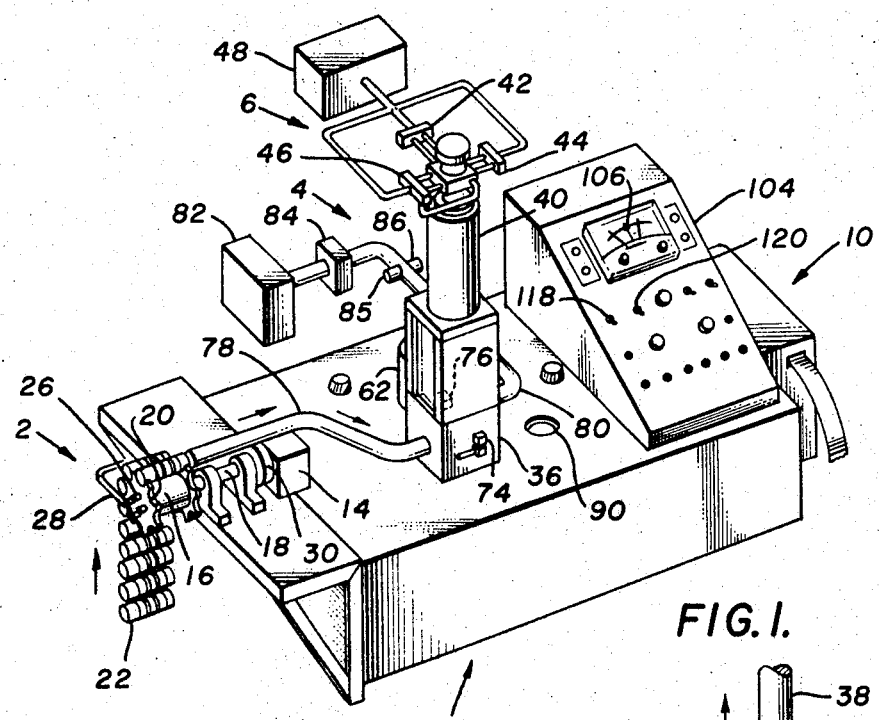
Figure 2:
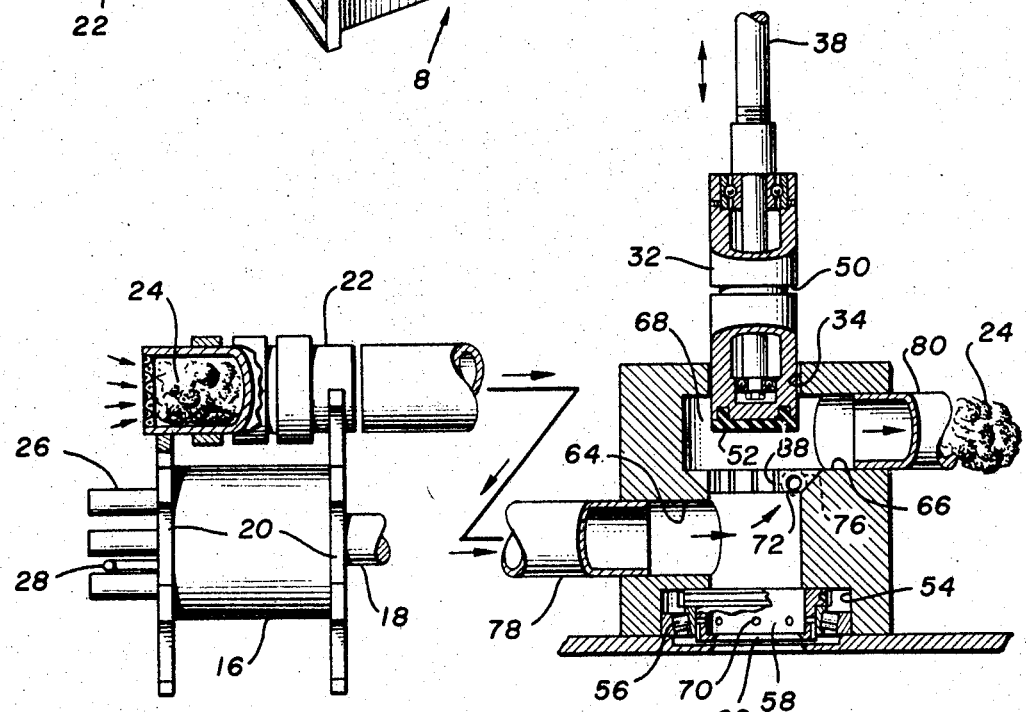
FIGURE 2 is an elevation view of portions of the automatic color comparator with certain components sectioned to indicate details of construction.
Figure 3:
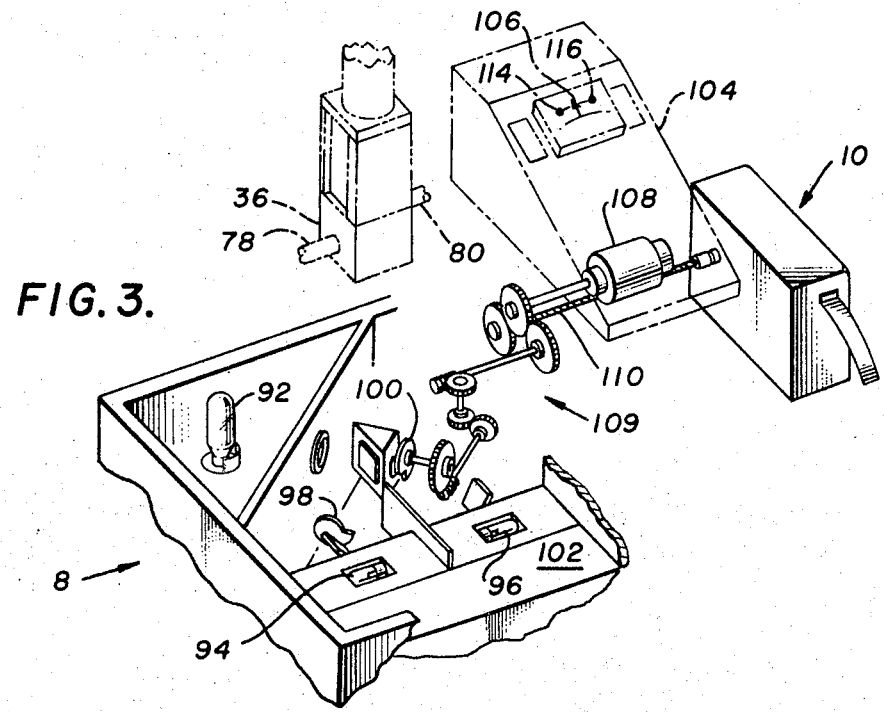
FIGURE 3 is a perspective view of other components of the automatic color comparator.
Figure 4:
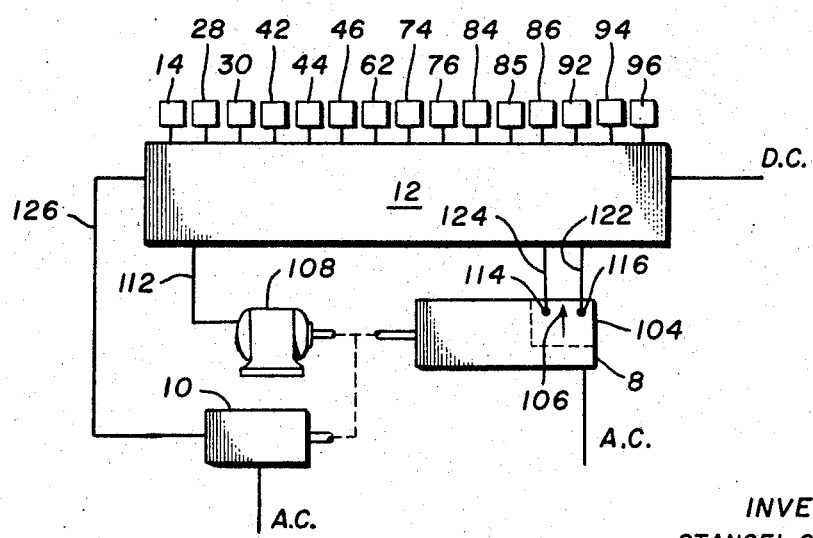
FIGURE 4 is a diagrammatic view showing the circuitry of the apparatus comprising the invention.

Referring to the drawings, FIGURES 1–4, the basic components of the automatic comparator embodying the invention comprise, a yarn sample indexing means 2, aspirator means 4, conditioning means 6, colorimeter means 8, counter-printer means 10, and control relay circuit means 12.

The indexing means 2 comprises a motor 14 connected to circuit 12 for driving and indexing a drum 16 mounted at the end of a shaft 18 driven by motor 14. Drum 16 has a plurality of circumferentially arranged recesses or stations 20 each adapted to hold a yarn sample cartridge 22. Cartridges 22 are linked to form a continuous flexible chain and are normally filled with dyed yarn samples 24. Preferably, one end of each cartridge 22 is plugged, capped, or screened to confine the yarn sample therein. The surfaces of recesses 20 and cartridges 22 are complementary so that cartridges 22 fit into recesses 20. The cartridge chain is mounted over the top of drum 16 and when the latter is indexed the cartridge chain is moved linearly from one side to the opposite side of drum 16.

Drum 16 is adapted to be indexed by a plurality of circumferentially spaced actuators 26 extending therefrom and a microswitch 28 connected to circuit 12 and positioned in the rotating plane of actuators 26. Drum 16, intermittently, carries the actuators 26 into contact with microswitch 28 for interruptingly deenergizing motor 14 through circuit 12. A magnetic brake 30 is mounted on shaft 18 and is energized through circuit 12 to rapidly brake shaft 18 when motor 14 is cut-off.

The conditioning means 6, that functions to prepare a bunched dyed yarn sample delivered to the colorimeter means 8 by the aspirator means 4, comprises a multiple position reciprocating piston 32 slidably and sealingly operable in a bore 34 defined in a casing 36. Piston 32 is rotatably mounted by bearing means to the end of an actuating stem 38 of a positioner device 40. The illustrated positioner device is a pneumatic-electric device adapted to provide three positions of piston 32: a load position, a compression position, and an unload position by means of three solenoid valves 42, 44, and 46, respectively, connected to a source of pressurized air 48 and to circuit 12. The positions of piston 32 are defined in the description of the operation of the automatic comparator. The positioner device 40 may be of the type marketed under the trademark of Conoflow and dispensed by the Conoflow Corporation, of Philadelphia, Pa.

Piston 32 has a groove 50, preferably circumferential, formed intermediate its ends and has a resilient cushion 52 secured thereto at its lower free end thereof.

At the lower end of bore 34 there is a counterbore 54 formed in casing 36. A bearing 56 pressed into counterbore 54 and a dished out sample cell or cup 58 having a glass bottom 60 is rotatably mounted in bearing 56 in an upright position. Sample cell 58 is coaxially aligned with piston 32 and is adapted by belt means passing through a slot in casing 36 to be rotated by a motor 62 connected to circuit 12.

An inlet port 64 extends through the wall of casing 36 slightly above cell 58 and a discharge port 66 is formed in casing 36 above and substantially opposite port 64. Bore 34, at the intersection with discharge port 66, has an increased diameter portion 68 forming an annular chamber around piston 32 when the latter is aligned therewith. The wall defining bore 34, between the inlet and discharge ports 64 and 66, is serrated to provide passages 88 for trapping the yarn sample and for permitting passage of air from inlet 64 to discharge port 66 when piston 32 is in its load position. A transverse bore 72 extends through casing 36 at a point coincident with the serrated section. Bore 72 intersects with bore 34. A light source 74 and a photocell 76 connected to circuit 12 are positioned at opposite ends of bore 34 and act to detect and signal circuit 12 of the presence of a yarn sample 24 in bore 34.

The aspirator means 4 includes an induction tube 78 connected at one end to inlet port 64 and having the opposite open end thereof positioned in line with a cartridge 22 indexed to a feed position; and, includes a discharge tube 80 having one end connected to discharge port 66 and the opposite end connected to a vacuum means 82 for producing a suction in the induction tube 78, bore 34 and discharge tube 80. A solenoid valve 84, connected to circuit 12 is interposed in discharge tube 80 for cutting off communication of tube 80 from vacuum means 82. A light source 85 and a photocell 86 connected to circuit 12 are also interposed in discharge tube 80 to detect the passage of an analyzed yarn sample. As an aid in dislodging a yarn sample 24 from cell 58 air passages 70 are provided through the side wall of cell 58. Air passages 70 are open to atmosphere through the bottom of bore 34 so that air is drawn through the passages 70 for dislodging a yarn sample 24 in cell 58 when a suction is created in bore 34.

Preferably, casing 36 is sectioned as shown, and is provided with a Plexiglas window for inspection purposes. Casing 36 is mounted on the colorimeter means 8, of conventional design, with cell 58 fitted into an opening from which the usual sample cell of a conventional colorimeter 8 has been removed. Since colorimeters are well known only the essential features thereof relating to the invention are described. Colorimeter means 8 includes a standard reference cell 90 for holding a color control or reference sample by which yarn samples 24 are compared. A light source 92 transmits light energy to the sample and reference cells, 58 and 90, past wedges 98 and 100 and the light is reflected from materials in cells 58 and 90 to photocells 94 and 96 respectively. Photocells 94 and 96 generate output signals which are transmitted to a differential amplifier 102 or comparator and a differential light reflectance input signal is transmitted therefrom to a meter 104. The input is indicated on the + or − side of a "null" position of a meter needle 106. In conventional practice a handle, connected to wedge 100 which is associated with reference cell 90, is manually cranked to return the needle back to a "null" position. The number of turns of the crank required to rotate wedge 100 to equate the light reflected from cell 90 with that reflected from cell 58 provides a compared measure of the difference in color of the sample yarn from the reference material.

The present invention provides means for automatically "nulling" meter 104 and for counting and printing the results. In the illustrated embodiment, a balancing motor 108 is connected through a gear arrangement 109 to the reference cell wedge 100 and to the shaft 110 of counter-printer 10. Balancing motor 108 is also connected to circuit 12 through a conductor 112. An upper and a lower limit contact 114 and 116, respectively, are provided at opposite sides of meter needle 106. Limit contacts 114 and 116 are connected to circuit 12 to function in a manner to be explained.

Prior to operation, the chain of cartridges 12 are loaded with dyed yarn samples 24 which are in the form of randomly bunched fluffs of yarn. The open end of each cartridge 22 is positioned to face the open end of induction tube 78. The cartridge chain is placed on the indexing drum 16 so that the cartridges 12 at one end of the chain fit into recesses 20. A standard dyed yarn sample or other color control sample is placed into the reference cell 90 and the cell is capped.

In operation, a master on-off switch 118 and a cycle power switch 120 are turned to the "on" position to begin the automatic operation. Motor 14 is energized through circuit 12 and drum 16 is rotated clockwise as viewed looking into the left side of the apparatus in FIG. 1. One of the actuators 2 then contacts microswitch 28 causing deenergizing of motor 14 and energizing of brake 30 to stop drum 16. One of the cartridges 22 will now be aligned with induction tube 78. Solenoid valve 42 is then energized by circuit 12 to cause the positioner device 40 to move piston 32 to its load position which is defined by the lower end of piston 32 being aligned with the serrated portion of bore 34 but to be positioned above bore 72. Communication of the induction tube 78 with the discharge tube 80 is cut-off with the exception of communication through passages 88. Solenoid valve 84 is also energized by circuit 12 to connect discharge tube 80 to vacuum means 82. Vacuum means 82 creates a suction at the end of induction tube 78. The vacuum in the induction tube 78 draws or ingests the yarn sample 24 from cartridge 22 and delivers it to bore 34. The yarn sample 24 lodges against cushion 52 of piston 32 and cuts-off the beam of light 74 from photocell 76. The latter through circuit 12 deenergizes solenoid 84 thereby disconnecting the vacuum means 82 from the discharge tube 80. Circuit 12 also deenergizes solenoid valve 42 and energizes solenoid valve 44 to change the pneumatic loading on piston 32 and to move piston 32 to its compression or lowermost position. In moving downward piston 32 compresses the yarn sample 24 against the glass bottom 60 of cell 58 and when piston 32 reaches its lowermost position defined when groove 50 aligns with bore 72 to permit light 74 to energize photocell 76. When circuit 12 receives an input signal from photocell 76, circuit 12 energizes spin motor 62 and the latter rotates cell 58. Because piston 32 is locked-in with cell 58 through the cushion 52 pressing on the sample yarn, piston 32 rotates with cell 58.

When the yarn sample 24 is conditioned by compression and rotation to provide a more accurate and uniform analysis of the yarn sample, the colorimeter 8 compares the color of the yarn sample 24 with the reference yarn or material. Light from source 92 is beamed to both the sample cell 58 and the reference cell 90 past wedges 98 and 100, and light energy not absorbed by the materials in the cells is reflected to corresponding photocells 94 and 96. Photocells 94 and 96 send electrical signals to the comparator amplifier 102; the latter sends a differential output signal to meter 104. Simultaneously, while the color comparison is being made by the colorimeter 8, balancing motor 108 is energized by circuit 12 and wedge 100 is driven in one direction across the light path traveling to photocell 96 to move needle 106 upscale toward limit contact 116. When needle 106 contacts limit contact 116, circuit 12 responds through conductor or lead 122 to reverse the polarity of motor 108 to drive wedge 100 in the opposite direction until needle 106 reaches the "null" position or contact 114. Control circuit 12 responds to contact of needle 106 with the "null" contact 114 through conductor or line 124 only while motor 108 is being driven in the reverse direction, to produce a "print" signal on a conductor or lead 126 thereby actuating printer 10. It will be understood that the meter circuit could be reversed so that needle 106 always initially moves downscale rather than upscale with the same results being effected. Control circuit 12 also responds to contact of needle 106 with "null" contact 114 through conductor or wire 124 to deenergize solenoid 44 and to energize solenoid 46 and 84. Energizing solenoid 46 causes positioner device 40 to move piston 32 to an unload position defined by piston 32 being actuated above discharge port 66. With piston 32 reciprocated to its unload position, photocell 76 now sends an input signal to circuit 12 and the latter responds to turn spin motor 62 off. Energizing solenoid 84 causes a suction to be created in bore 34 so that the yarn sample in cell 58 is lifted from the cell 58 with the aid of the auxiliary air from passages 70 and is transported through discharge tube 80 and is removed from the comparator. Photocell 86 detects the passage of yarn sample 24 through discharge tube 80 and sends an input signal to circuit 12. Circuit 12 then originates another sample analysis cycle by signaling the piston 32 to return to the load position where it actuates the deenergizing of magnetic brake 30 and energizing of motor 14.

The novel color comparator is self-operable and rapidly analyzes sample after sample.

The color comparison apparatus was divided into basic components in the description thereof for purposes of illustration only; no strict categorizing of the elements is intended.

A sequential and continual chromatic comparison method is provided wherein color samples are indexed or delivered to a transfer station and transferred therefrom to a color comparison zone for chromatic measurement against a reference sample. In the color comparison zone, the color sample is conditioned by compression and rotation and a color comparison is effected between the color sample and the reference sample wherein any unbalanced chromatic deviation therebetween is sensed. The deviation is then unbalanced and reduced to a count which is recorded or printed. The color sample is then discharged from the color comparison zone and another color sample is delivered to the transfer station and the sequence repeated. Preferably, the delivery of the color sample to the color comparison zone and the discharge therefrom is pneumaticaly effected.

It will be understood that variations and modifications of the novel apparatus and method of the invention are intended to be covered within the spirit of the invention and the scope of the following claims.

We claim:

1. Automatic color comparison apparatus comprising in combination,
   (a) circuit control means,
   (b) a drum having a plurality of index stations supplied with color sample holders,
   (c) means connected to said circuit control means for indexing said drum,
   (d) color comparison means connected to said circuit control means and provided with a rotatable sample cell and a reference cell, a light source and photocells, said color comparison means being adapted to sense the chromatic deviation of a color sample normally positioned in said sample cell from a reference sample normally positioned in said reference cell,
   (e) a casing defining a bore, an inlet port and a discharge port open to said bore, and grooves forming passages in the wall defining said bore adjacent said discharge port and between the latter and said inlet port,
   (f) said sample cell being positioned in one end of said bore,
   (g) power means connected to said circuit control means for rotating said sample cell,
   (h) sensing means connected to said circuit control means for detecting the presence of a color sample in said bore,
   (i) actuating means extending into the opposite end of said bore,
   (j) a piston rotatably mounted on one end of said actuating stem and to said circuit control means for moving said piston to a load position, a compression position, and an unload position,
   (k) recess means on said piston, said recess means cooperating with said sensing means to detect the compression position of said piston,
   (l) an induction conduit connected at one end to said inlet port and having its opposite free end positioned in close adjacency to said drum and in alignment with an indexed sample holder,
   (m) aspirator means,
   (n) a discharge conduit connected at one end to said discharge port and to said aspirator means at its opposite end thereof,
   (o) said aspirator means providing a suction in said induction conduit, said bore, and said discharge conduit for delivering a color sample to and discharging the same from said sample cell,
   (p) another sensing means connected to said circuit means for detecting the passage of a color sample through said discharge conduit,
   (q) valve means connected to said circuit control means for cutting off said aspirator means from said discharge conduit,
   (r) counter-recorder means connected to said circuit control means for recording the deviation of chroma of the color sample from the chroma of the reference sample as sensed by said color comparison means,
   (s) balancing means connected to said circuit control means, said color comparison means and said counter-recorder means, for balancing the chromatic sensing of said color comparison means and controlling said counter-recorder means to record the sensed color deviation.

2. Automatic color comparison apparatus comprising in combination,
   (a) circuit control means,
   (b) a drum having a plurality of indexing stations,
   (c) a flexible endless sample holding cartridge chain mounted on said drum,
   (d) means connected to said circuit control means for indexing said drum,
   (e) color comparison means connected to said circuit control means, said color comparison means comprising a rotatable sample cell and a reference cell, a source of light, a pair of photoelectric devices one identified with said sample cell and the other identified with said reference cell, a wedge operable with said one photoelectric device and another driven widge operable with said other photoelectric device, amplifier means connected to said photoelectric devices, and a meter connected to said amplifier means,
   (f) said color comparison means being adapted to sense the chromatic deviation of a color sample normally positioned in said sample cell from a reference sample normally positioned in said reference cell,
   (g) a casing defining a bore, an inlet and a discharge port open to said bore, and grooves providing passages in the wall defining said bore adjacent said discharge port and between the latter and said inlet port,
   (h) said sample cell being positioned in one end of said bore,
   (i) power means connected to said circuit control means for rotating said sample cell,
   (j) sensing means connected to said circuit control means for detecting the presence of a color sample in said bore,
   (k) actuating means extending into the opposite end of said bore,
   (l) a piston having a free end and being rotatably mounted on one end of said actutaing stem and slidably operable in said bore,
   (m) positioner means connected to the other end of said actuating stem and to said circuit control means for moving said piston to a load position, a compression position, and an unload position,
   (n) recess means on said piston, said recess means cooperating with said sensing means to detect the compression position of said piston,
   (o) an induction conduit connected at one end to said inlet port and having its opposite free end positioned in close adjacency to said drum and in alignment with an indexed cartridge,
   (p) aspirator means,
   (q) a discharge conduit connected at one end to said discharge port and to said aspirator means at its opposite end thereof,
   (r) said aspirator mean providing a suction in said induction conduit, said bore, and said discharge conduit for delivering a color sample from an indexed cartridge to said sample cell via said inlet conduit and for discharging said sample cell therefrom via said discharge conduit,
   (s) another sensing means connected to said circuit means for detecting the passage of a color sample through said discharge conduit, (t) valve means connected to said circuit control means for cutting off said aspirator means from said discharge conduit, (u) counter-recorder means connected to said circuit control means for recording the deviation of chroma of the color sample from the chroma of the reference sample as sensed by said color comparison means, (v) a balancing motor connected to said circuit control means and to said driven wedge and to said counter-recorder means through a gear arrangement for balancing the chromatic sensing of said color comparison means and controlling said counter-reader means to record the sensed color deviation.

3. Automatic color comparison apparatus as in claim 2, wherein, said sample cell has a plurality of passages therein open to said bore and to atmosphere.

4. Automatic color comparison apparatus as in claim 2, wherein, said bore has an increased diameter portion coincident with the point of intersection of said discharge port with said bore.

5. Automatic color comparison apparatus as in claim 2, wherein, braking means connected to said circuit control means is incorporated with said means for indexing said drum for braking the latter.

6. Automatic color comparison apparatus as in claim 2, wherein, a resilient member is secured to said free end of said piston.

7. In a colorimeter of the type having a rotatable sample and a reference cell, a light source, photocells for receiving reflected light from sample and reference materials supplied to the sample and reference cells, and measuring means for comparing signals received from said photocells, the improvement comprising; aspirator means providing a suction for propelling sample materials to and for evacuating the same from said sample cell, and conditioning means adapted to compress the sample material in said sample cell and to rotate therewith.

8. In a colorimeter as in claim 7, further comprising indexing means for indexing said color samples one by one to said aspirator means, and control means for actuating said indexing means, said aspirator means, said conditioning means, and said colorimeter in sequence to supply the aspirator means with a color sample, to propel the color sample to said sample cell, to condition said color sample, to measure the color of said color sample relative to a reference sample, to lift and propel the color sample from said sample cell, and to continuously and uninterruptedly repeat the sequence of operation.

9. A method for comparing compressible color samples against a reference sample for chromaticity in sequential steps comprising, indexing a color sample to a conveyor, conveying the color sample to a color comparison zone, compressing and rotating the color sample in said color comparison zone, effecting a color measurement of said color sample relative to a reference sample, conveying the color sample from said color comparison zone and discharging the same, and without interruption, processing other color samples repeatedly.

10. A method as in claim 9, wherein the step of conveying is performed pneumatically.

References Cited

UNITED STATES PATENTS

| | | | |
|---|---|---|---|
| 1,015,730 | 1/1912 | Gill. | |
| 1,771,697 | 7/1930 | Underwood et al. | |
| 2,054,319 | 9/1936 | Hanson | 221—211 X |
| 2,292,230 | 8/1942 | Lemon. | |
| 2,331,277 | 10/1943 | Stout | 250—218 X |
| 3,031,917 | 5/1962 | Pelavin | 250—211 X |
| 3,322,958 | 5/1967 | Heiss | 250—218 |
| 3,340,764 | 9/1967 | Bergson. | |

FOREIGN PATENTS 330,044  5/1956  Germany.

RONALD L. WIBERT, *Primary Examiner.*

W. A. SKLAR, *Assistant Examiner.*

U.S. Cl. X.R.

221—211, 278; 222—193; 365, 196